April 5, 1927.
A. W. RYBECK
1,623,557
VALVE
Filed March 21, 1923
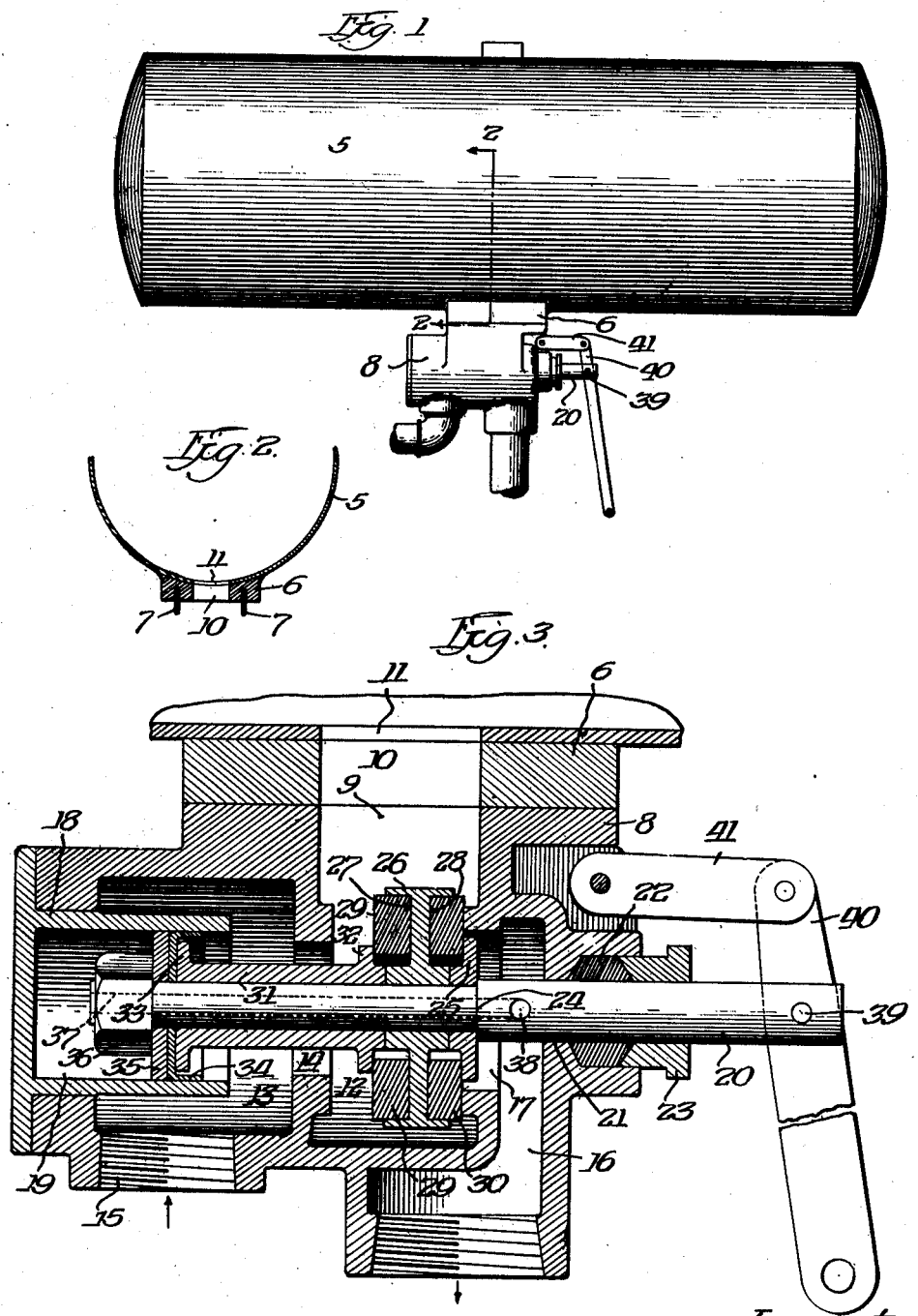
Inventor:
Adolph W. Rybeck.

Patented Apr. 5, 1927.

1,623,557

UNITED STATES PATENT OFFICE.

ADOLPH W. RYBECK, OF MILWAUKEE, WISCONSIN, ASSIGNOR TO THE T. L. SMITH COMPANY, OF MILWAUKEE, WISCONSIN, A CORPORATION OF WISCONSIN.

VALVE.

Application filed March 21, 1923. Serial No. 626,471.

This invention relates to a new and improved valve and more specifically to three-way valves adapted for use in connection with water or other liquid holding and measuring tanks.

Valves of this character are particularly useful in connection with machinery such as concrete mixers which require the rapid discharge of a measured amount of water at short intervals. The tank is ordinarily connected with a source of supply of water under pressure and between discharge intervals this water under pressure fills the tank. When the valve is operated, the water under pressure is cut off and the contents of the tank are delivered by gravity through a pipe to the mixing drum.

Usual types of three-way valves have been used for this purpose but as the water supplied often contains sand and other impurities which cause wear of the valve and as the valves in service are actuated a very large number of times each day, the wear is sufficient to require their replacement at considerable expense at short intervals.

It is an object of the present invention to provide a valve adapted to cut off water supplied through one opening and by the same movement to open a discharge passage for water, and to operate in the reverse manner upon being operated in the opposite direction.

It is another object to provide a valve of the type described which is retained in either of its operative positions by the pressure of the fluid controlled.

It is a further object to provide a valve of this character which operates against vertically extending valve seats whereby wear upon the valve due to foreign matter lodged upon the seats is minimized.

It is an additional object to provide a valve construction in which the contacting faces of the valve are readily replaceable at small cost.

Other and further objects will appear as the description proceeds.

I have illustrated a preferred embodiment of my invention in the accompanying drawings in which:—

Figure 1 is a view of a tank showing my improved valve construction applied thereto;

Figure 2 is a fragmentary section taken on line 2—2 of Figure 1; and

Figure 3 is a section of the valve taken on an enlarged scale.

The tank 5 has the securing plate 6 fastened thereto by welding or by other suitable means. The plate 6 is provided with stud bolts 7 by means of which the valve body 8 is secured to the tank. The valve body 8 is provided with the opening 9 upon its upper face adapted to register with opening 10 in the plate and opening 11 in the tank.

The central chamber 12 in the valve is located below the opening 9 and connects with the inlet chamber 13 through the opening 14. Chamber 13 is provided with threaded inlet opening 15. The chamber 12 also connects upon its opposite side with the discharge chamber 16 through opening 17. The sleeve 18 is fitted into an opening in the outer side of the inlet chamber 13 and the sleeve is provided with a cylindrical recess 19 which is concentric with the axis of the circular openings 14 and 17.

The piston rod 20 passes into the valve chambers through opening 21 and this opening is sealed by packing 22 and follower 23. The piston 20 is provided with the shoulder 24 against which is fitted the washer 25. The valve disc 26 is fitted upon the rod bearing against the washer 25 and this disc is provided upon its opposite faces with recesses 27 and 28 which receive the packing rings 29 and 30. The collar 31 is fitted upon the piston rod 20 and is provided with the shoulder 32 which engages packing ring 29.

The shoulder 33 upon the opposite end of collar 31 bears against the packing cup 34, the opposite side of which is engaged by washer 35 retained in place by nut 36. The axial passage 37 indicated by broken lines extends through the inner portion of the piston rod 20 and opens into the discharge chamber through the lateral opening 38. The outer end of the piston rod is pivotally connected at 39 to the operating lever 40, the upper end of which is connected by link 41 to the valve body 8.

With the valve in the position shown in Figure 3, the water under pressure passes through opening 15, the inlet chamber 13, and opening 14 to the main valve chamber 12, which is in communication with the tank. The water will fill the tank if the valve is left in this position a sufficient length of time, the time, of course, varying according to the size of pipe and of tank and the pressure. The water pressure bears against the enlarged portion 33 of the collar 31 and against the packing cup 34. Their area is, however, less than the effective area upon which the same pressure operates upon the valve disc 26 and the valve packing members carried by the disc. Consequently the water pressure maintains the valve in the position shown.

When it is desired to discharge the tank, the lower end of the lever 40 is thrust to the left and the valve disc 29 is brought against the valve seat surrounding the opening 14. As the piston is moved to the left, the fluid behind the washer 35 in the recess 19 in the cup 18 is permitted to escape through bore 37 and opening 38. Consequently there is no resistance to the movement of the valve offered by trapped fluid. The liquid in the tank is now free to pass from chamber 12 through opening 17 and through outlet chamber 16 to the mixer drum or other liquid using apparatus. With the packing ring 29 seated against the valve face, the effective pressure area of the water under pressure is limited to the size of the opening 14 less the outer diameter of the collar 31. This area is less than that of the inner bore of the sleeve 19 and consequently the excess pressure is now directed against enlargement 33 and packing cup 34. The water pressure thus now serves to keep the valve in this position.

Due to the particular relation of the sizes of the pressure areas as described, the valve is maintained by pressure in either of these extreme positions. It is only necessary to overcome the excess of pressure and to unseat the valve and this excess may be comparatively slight.

The valve may be readily dismantled to displace the packing rings 29 and 30 when these become worn. The sleeve 18 is removed and by then removing the nut 36 the piston rod may be removed to the right. The washer 35, packing cup 34 and collar 31 are removed through the opening closed by sleeve 18. The valve body is disconnected from the tank and the main valve disc 26 and the packing rings 29 and 30 are removed through the opening 9 at the upper side of the main chamber 12. New packing rings may be placed against the valve disc 26 and the parts reassembled by reversing the operation just described.

Due to the fact that the valve faces are vertical, there is no tendency for grit or foreign matter to accumulate on the valve faces and the wear is thus minimized. When it is necessary to replace the packing this may be done in a comparatively short time and at very slight cost.

It will be understood that there may be some slight leakage of the water under pressure through opening 14 and around the valve disc and opening 17 as the valve is being operated. This leakage, however, will be comparatively slight when the valve is operated by a single rapid movement and will not be sufficient to make any material difference in the amount of water supplied from the tank. Moreover, with uniform operation, this leakage will be substantially uniform.

I claim:

1. In a valve construction, a valve body, a valve chamber, openings in opposed walls of said chamber, a valve rod extending through said chamber and openings, a shoulder on said rod, a washer bearing against said shoulder, a valve member fitted on said rod, a packing ring retained between said washer and valve member, a collar fitted on said rod, a second packing ring retained between said collar and valve member, and removable means adapted to retain said members in position on the valve rod, said washer and collar being removable axially of the rod through the openings and an opening in the valve body whereby the valve member and packing rings may be removed radially after withdrawal of the valve rod.

2. In a valve construction, a valve body, a main valve chamber, an inlet chamber, an opening connecting said chambers, an outlet opening in the main chamber wall opposite said inlet opening, a sleeve fitted in the wall of said inlet chamber opposite the openings, a valve rod extending through said openings and into said sleeve, a shoulder on said rod, a washer bearing against said shoulder, a valve member fitted on said rod, a packing ring retained between said washer and valve member, a collar fitted on said rod, a second packing ring retained between said collar and valve member, a packing member fitted on said rod against the collar and in the sleeve, a second washer against the opposite face of the packing member and a nut threaded on the end of said rod against the second washer and adapted to retain all said elements upon said rod against the shoulder on the rod.

3. In a valve construction, a valve body, a main valve chamber, an inlet chamber, an opening connecting said chambers, an outlet opening in the main chamber wall opposite said inlet opening, a sleeve fitted in the wall of said inlet chamber opposite the openings, a valve rod extending through said openings and into said sleeve, a shoulder on said rod, a washer bearing against said shoulder, a valve member fitted on said rod, a packing ring retained between said washer and valve member, a collar fitted on said rod, a second packing ring retained between said collar and valve member, a packing member fitted on said rod against the collar and in the sleeve, a second washer against the opposite face of the packing member and a nut threaded on the end of said rod against the second washer and adapted to retain all said elements upon said rod against the shoulder on the rod, said sleeve being removable and the nut, second washer, packing member, collar and first-named washer being removable through the sleeve opening, and an opening in the valve body whereby the valve member and packing rings may be removed radially after axial withdrawal of the valve rod.

Signed at Milwaukee, Wisconsin, this 16th day of March, 1923.

ADOLPH W. RYBECK.